Feb. 7, 1939.  L. A. HANSEN  2,146,212
BRAKE RIGGING
Filed Aug. 15, 1938  3 Sheets-Sheet 1
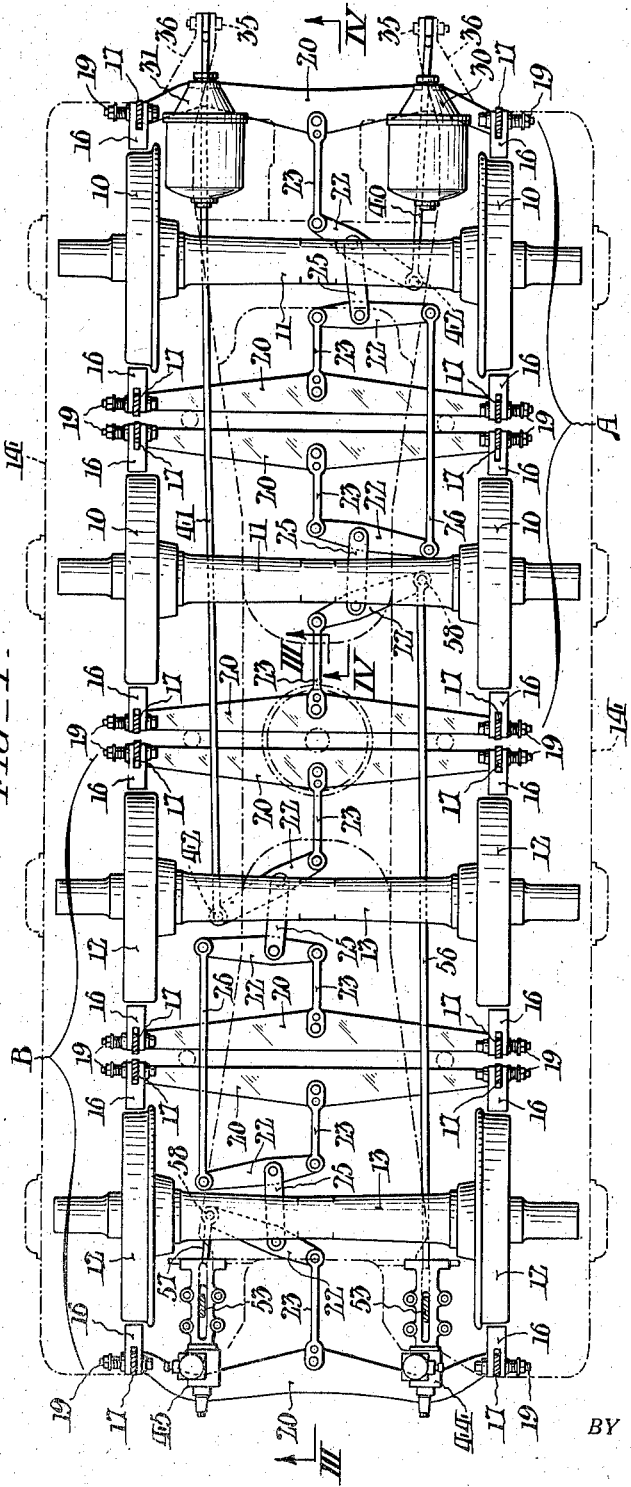
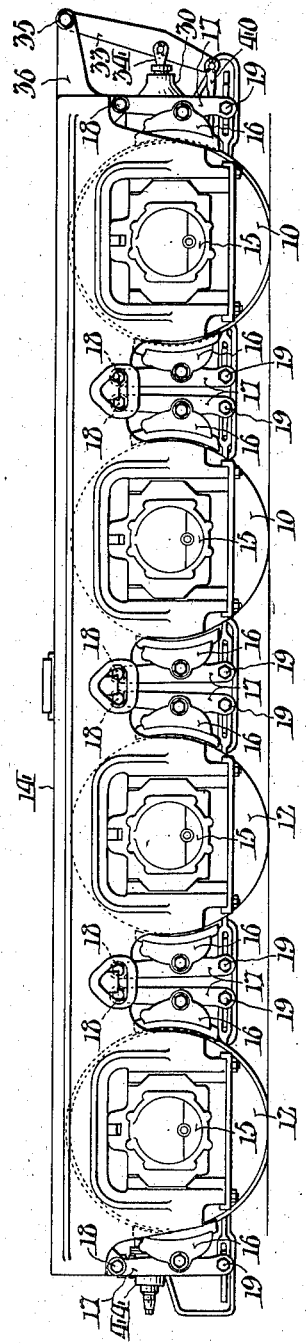
INVENTOR:
Larry A. Hansen,
BY Paul & Paul
ATTORNEYS.

Feb. 7, 1939.  L. A. HANSEN  2,146,212
BRAKE RIGGING
Filed Aug. 15, 1938  3 Sheets-Sheet 2
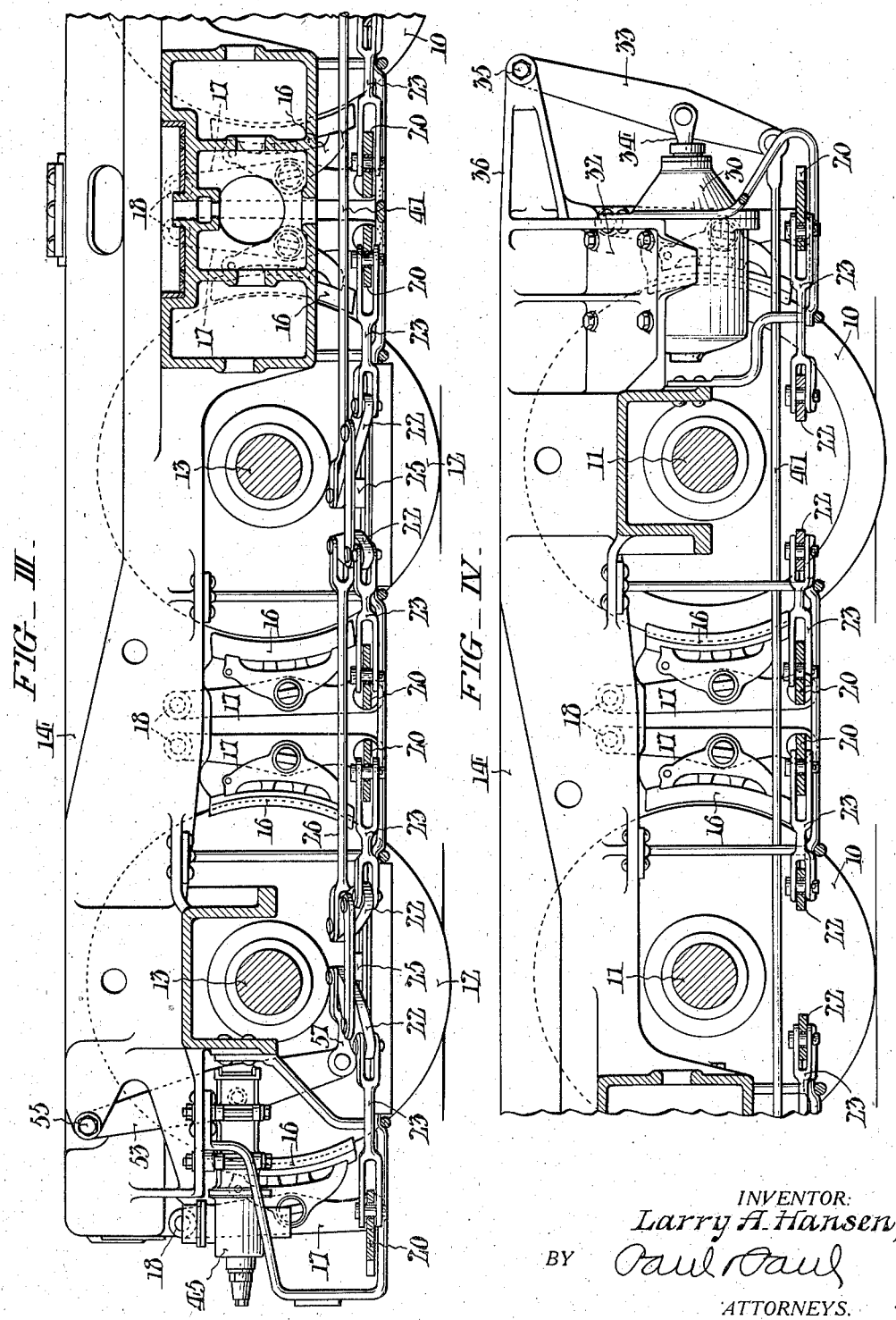
INVENTOR:
Larry A. Hansen,
BY
ATTORNEYS.

Feb. 7, 1939.     L. A. HANSEN     2,146,212
BRAKE RIGGING
Filed Aug. 15, 1938     3 Sheets-Sheet 3
FIG_VI_
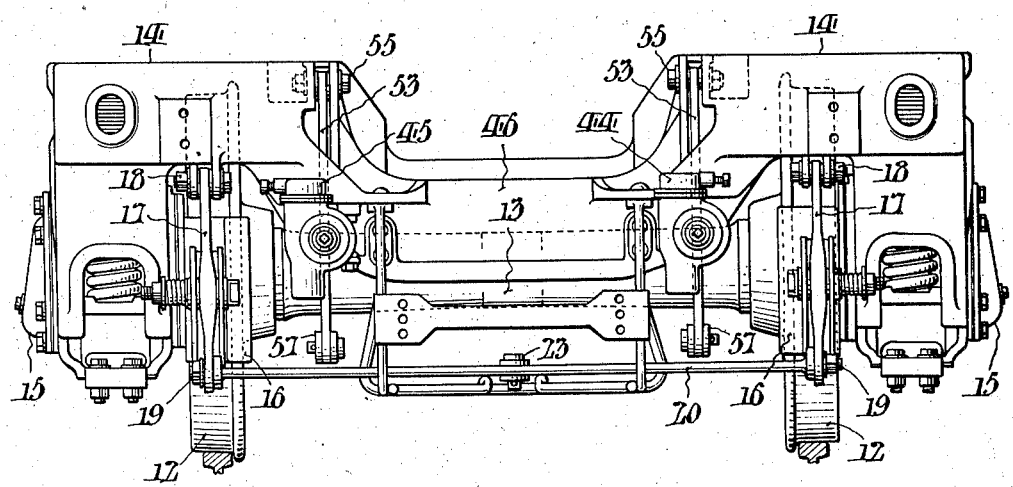
FIG_V_
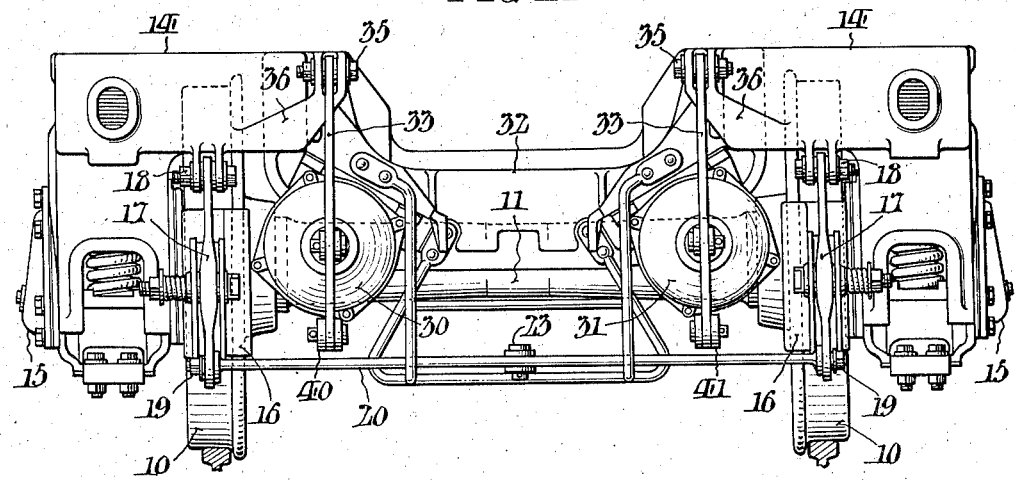
WITNESSES:
INVENTOR:
Larry A. Hansen,
BY
ATTORNEYS.

Patented Feb. 7, 1939

2,146,212

UNITED STATES PATENT OFFICE 2,146,212

BRAKE RIGGING

Larry A. Hansen, Philadelphia, Pa., assignor to The Pennsylvania Railroad Company, Philadelphia, Pa., a corporation of Pennsylvania Application August 15, 1938, Serial No. 224,939

7 Claims. (Cl. 188—46)

This invention relates to brake systems or brake rigging for railway vehicles or trucks, and is especially advantageous where a relatively large number of wheels are involved, as in the case of trucks for locomotive tenders, where as many as four axles and pairs of wheels may be mounted on one truck frame. I aim to minimize slack in the brake rigging, and idle piston travel; to obviate or avoid any tendency to slue the truck, if one of two more or less separate brake systems on such truck should fail, while allowing the other brake system to be fully effective; to minimize the piping required, and the cost of the brake equipment; and to facilitate and cheapen the adjustment and other servicing work required. I also aim to minimize wear of brake shoes, and to assure even wear. Other features and advantages of the invention will appear from the following description of a species or form of embodiment, and from the drawings. All the features and combinations shown or described are, indeed, of my invention, so far as novel over the prior art.

In the drawings, Fig. I is a plan view showing the truck wheels and the brake mechanism, certain parts being shown in horizontal section, and the outlines of the truck frame being shown in dot-and-dash lines.

Fig. II is a side view of the truck, with its wheels and brake mechanism.

Fig. III shows a vertical longitudinal section through the right-hand portion of the truck in Fig. I, taken as indicated by the line and arrows III—III in Fig. I; and Fig. IV is a similar view of the left-hand portion of the truck, taken as indicated by the line and arrows IV—IV in Fig. I.

Fig. V is an end view of the truck from the right in Figs. I and II; and Fig. VI is a similar view from the left.

The particular truck here illustrated is especially adapted for a locomotive tender, and has eight wheels on four axles. For convenience, the right-hand end of the truck in Figs. I and II may arbitrarily be referred to as its front end, and the other end as its rear end. The wheels that carry the front or right-hand end of the truck are designated 10, 10, 10, 10, and their axles 11, 11; while the wheels that carry its rear or left-hand end are designated 12, 12, 12, 12, and their axles 13, 13. As shown, the wheels 10, 10 and 12, 12 under the extreme ends of the truck are flanged, while the other wheels are without flanges. The truck frame 14 may have the usual pedestal jaws for the axle bearing boxes 15. To avoid obscuring other parts, the springs and spring rigging are omitted from most of the figures of the drawings, since they have nothing to do with the present invention.

As shown in Fig. I, the brake riggings A and B for the wheels 10, 10, 10, 10 and 12, 12, 12, 12 at the two ends of the truck are substantially alike. In this particular instance, there are two brakes or brake members (heads and shoes taken together) 16, 16 for each wheel, arranged to operate as clasp brakes. As shown in Figs. I, II, III, and IV, the brake members 16 are pivotally mounted on upright brake hanger levers 17. The upper ends of the hangers 17 are fulcrumed on the truck frame 14 at 18, above the level of the axles 11 and 13, and their lower ends are pivoted at 19 to the ends of the transverse brake beams 20. Thus each brake-beam 20 interconnects hanger levers 17, 17 carrying the brake members 16, 16 at the same side of the wheels 10 on an axle 11 or 13. The brake beams 20 are operated by floating horizontal levers 22, each of which has one end pivoted or pivotally connected to a brake-beam 20 at its middle, by means of a rod or fulcrum bracket 23 attached to the brake-beam. The operating levers 22 associated with the brake beams 20 at opposite sides of each wheel 10 or 12 are interconnected by link rods 25 pivoted to them at intermediate points in their length; and the operating levers 22, 22 between the axles 11, 11 or 13, 13 at each end of the truck have their outer ends (remote from the middle of the associated brake beams 20, 20) interconnected by a link rod 26. As shown in Fig. I, the operating levers 22 associated with the front wheels 10, 10, 10, 10 extend from the mid-line of the truck outward toward one side thereof, and the operating levers 22 associated with the rear wheels 12, 12 extend outward toward the other side of the truck.

Preferably, the brake riggings A, B for the wheels 10, 10, 10, 10 and 12, 12, 12, 12 at the opposite ends of the truck are separate mechanisms, and are separately operated and adjusted,—being in effect wholly separate unified brake systems, each effective as a unit on the wheels at both sides of the truck.

The brake riggings A and B are operated by brake cylinders 30 and 31 at one end of the truck, mounted on inward and downward sloping portions of the forward transverse end member 32 of the truck frame 14, at an intermediate level above the track. Preferably, the brake cylinders 30, 31 are connected to the brake riggings A, B through upright levers 33, pivoted to the piston rods 34 of the cylinders 30, 31 at intermediate points in their length. As shown, the upper ends of the levers 33 are fulcrumed at 35 on projecting brackets 36 at the top of the truck frame 14, and their lower ends are connected to the brake riggings A and B through link rods 40 and 41, whose rear ends are pivoted at 42 to the outer ends of the nearest operating levers 22, 22 of the two brake riggings. Accordingly, the brake-rod 41 for the rear brake rigging B extends rearward past the forward rigging A, along the opposite side of the truck from the levers 22 of rigging A.

For adjusting the two brake riggings A, B, there are slack adjusters 44, 45 (of any suitable type) at the opposite end of the truck from the brake-cylinders 30, 31, mounted on inward and downward sloping portions of the rear transverse end member 46 of the truck frame 14, at an intermediate level above the track. Preferably, upright levers 53 are interposed in the connections of the adjusters 44, 45 to the brake riggings A, B. As shown, these levers 53 are fulcrumed at 55 on brackets at the top of the truck frame 14, are pivoted to the slack adjusters 44, 45 at intermediate points in their length, and have their lower ends connected to the riggings A, B through link rods 56, 57, whose forward ends are pivoted at 58 to the ends of the nearest operating levers 22 of the two brake riggings. The anchorage or slack-adjusting rod 56 for the forward brake rigging A extends forward past the rear rigging B, along the opposite side of the truck from the levers 22 of rigging B and from the brake rod 57 of said rigging B.

The provision of separate brake riggings or unified systems A and B for opposite ends of the truck as described above minimizes the slack in each brake-rigging and the idle piston travel necessary to take up the slack. It is also much superior to any arrangement providing one brake system or rigging for all the wheels at one side of the truck, and another such system for all the wheels at the other side of the truck: not only because each of such "one-side" brake riggings would have double the slack that exists in either of the riggings A and B of my arrangement, but also because my arrangement has no tendency to slew the truck around and produce a derailment, if one of the brake-systems or riggings A or B fails to function since both of them act on the wheels at both sides of the truck; whereas such a slewing tendency is very pronounced when there is a failure of a separate brake-system for the wheels at one side of a truck.

In my arrangement, furthermore, both the brake riggings A and B are operated from one end of the truck, and both are adjusted (to take up any excessive slack) from the other end of the truck. Accordingly, both brake cylinders 30, 31 can be located at the end of the truck where other parts (including those on the tender or car-body carried by the truck) afford more ample working room for servicing the cylinders, while the slack-adjusters 44, 45 (at which much less working room is needed) can be located at the more encumbered end of the truck. This not only makes the parts requiring inspection, adjustment, or repair very conveniently accessible, but also shortens the piping required, and minimizes the necessity of passing from one point of the truck to another in servicing,—all of which allows the servicing work to be done more easily and with less exertion, and in less time.

The heads of the brake members 16 are shown in Figs. III, IV, V, and VI as mounted on the brake hanger levers 17 but the details of such mounts form no part of my present invention, and hence are not herein illustrated or described.

Having thus described my invention, I claim:

1. The combination with a railway truck, pairs of wheels for both ends thereof, a unified system of brakes and brake rigging for the pairs of wheels carrying one end of the truck, and a unified system of brakes and brake rigging for the pairs of wheels carrying the other end of the truck, of brake cylinders at one end of the truck with separate operating connections to the aforesaid systems of brakes and brake rigging, and slack adjusters at the other end of the truck also with separate connections to the aforesaid systems of brakes and brake rigging.

2. The combination with a railway truck, a pair of axles with wheels thereon for each end of the truck, and separate unified systems of brakes and brake rigging for the pairs of wheels on the axles carrying the two ends of the truck, of brake cylinders at one end of the truck with separate operating connections to the aforesaid systems of brakes and brake rigging, and slack adjusters at the other end of the truck also with separate connections to the aforesaid systems of brakes and brake rigging.

3. The combination with a railway truck, pairs of wheels for both ends thereof, and separate unified systems of clasp brakes and brake rigging for the pairs of wheels carrying the two ends of the truck, of brake cylinders at one end of the truck with separate operating connections to the aforesaid systems of brakes and brake rigging, and slack adjusters at the other end of the truck also with separate connections to the aforesaid systems of brakes and brake rigging.

4. The combination with a railway truck including a frame and pairs of wheels for both ends of the truck, and separate unified systems of brakes and brake rigging for the pairs of wheels carrying the two ends of said truck, of brake cylinders at one end of the truck mounted on a transverse end member of its frame, with separate operating connections to the aforesaid systems of brakes and brake rigging, and slack adjusters at the other end of the truck mounted on a transverse end member of the truck frame, also with separate connections to the aforesaid systems of brakes and brake rigging.

5. The combination with a railway truck including a frame and pairs of wheels for both ends of the truck, a unified system of brakes and brake rigging for the pairs of wheels carrying one end of the truck, and a unified system of brakes and brake rigging for the pairs of wheels carrying the other end of the truck, of brake cylinders at one end of the truck mounted on its frame at an intermediate level above the track, with separate operating connections to the aforesaid systems of brakes and brake rigging, including levers fulcrumed on the truck frame above said cylinders and connected from below the latter to the brake riggings of the systems, and slack adjusters at the other end of the truck mounted on the truck frame at an intermediate level above the track, also with separate connections to the aforesaid systems of brakes and brake rigging, including levers fulcrumed on the truck frame above said cylinders and connected from below the latter to the brake riggings of the systems.

6. The combination with a railway truck, pairs of wheels for both ends thereof, a unified system of brakes and brake rigging for the pairs of wheels carrying one end of the truck, including operating levers extending toward one side thereof, and a unified system of brakes and brake rigging for the pairs of wheels carrying the other end of the truck, including operating levers extending toward the other side thereof, of brake cylinders at one end of the truck with separate operating connections to the aforesaid systems of brakes and brake rigging, the operating connection to the rigging more remote from said cylinders including a brake rod extending past the operating levers of the rigging nearer the cylinders along the opposite side of the truck from these levers to an operating lever of said remote brake rigging, and slack adjusters at the other end of the truck also with separate connections to the aforesaid systems of brakes and brake rigging, the connection to the rigging more remote from said slack adjusters including a rod extending past the operating levers of the rigging nearer the slack adjusters along the opposite side of the truck from these levers to an operating lever of said rigging further from the slack adjusters.

7. The combination with a railway truck including a frame, a pair of axles with wheels thereon for each end of the truck, a unified system of clasp brakes and brake rigging for the pairs of wheels on the axles carrying one end of the truck, including operating levers extending toward one side thereof, and a unified system of clasp brakes and brake rigging for the pairs of wheels on the axles carrying the other end of the truck, including operating levers extending toward the other side thereof, of brake cylinders at one end of the truck mounted on its frame at an intermediate level above the track, with separate operating connections to the aforesaid systems of brakes and brake riggings, including levers fulcrumed on the truck frame above said cylinders and connected from below the latter to the brake riggings of the systems, and slack adjusters at the other end of the truck mounted on the truck frame at an intermediate level above the track, also with separate connections to the aforesaid systems of brakes and brake rigging, including levers fulcrumed on the truck frame above said cylinders and connected from below the latter to the brake riggings of the systems, the brake cylinder and slack adjuster for each brake rigging being at the side of the truck opposite the aforesaid operating levers of such brake rigging.

LARRY A. HANSEN.